US 6,622,829 B2

(12) United States Patent
Oliver et al.

(10) Patent No.: US 6,622,829 B2
(45) Date of Patent: Sep. 23, 2003

(54) ROTARY DAMPER

(75) Inventors: Michael Leslie Oliver, Xenia, OH (US); William Charles Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 5 days.

(21) Appl. No.: 09/829,430

(22) Filed: Apr. 9, 2001

(65) Prior Publication Data

US 2001/0054528 A1 Dec. 27, 2001

Related U.S. Application Data

(63) Continuation-in-part of application No. 09/494,996, filed on Jan. 31, 2000, now Pat. No. 6,296,090.

(51) Int. Cl.[7] .................................................. F16F 9/28
(52) U.S. Cl. ...................................... 188/303; 188/290
(58) Field of Search ................................. 188/303, 290, 188/295, 266.1, 297, 302, 304, 322.12

(56) References Cited

U.S. PATENT DOCUMENTS

| 1,803,287 | A | * | 4/1931 | Warburton | 188/303 |
|---|---|---|---|---|---|
| 1,841,287 | A | * | 1/1932 | Gruss | 188/303 |
| 1,842,821 | A | * | 1/1932 | Chryst | 188/304 |
| 1,871,954 | A | * | 8/1932 | Chryst | 188/129 |
| 1,912,092 | A | * | 5/1933 | Parker | 188/285 |
| 1,967,169 | A | * | 7/1934 | Armstrong | 188/303 |
| 1,967,170 | A | * | 7/1934 | Armstrong | 188/303 |
| 2,119,453 | A | * | 5/1938 | Cosentino | 188/303 |
| 2,192,942 | A | * | 3/1940 | Rossman | 348/195 |
| 2,212,259 | A | * | 8/1940 | Binder | 188/303 |
| 2,559,968 | A | * | 7/1951 | Katz | 188/282.7 |
| 2,605,861 | A | * | 8/1952 | De Loe | 188/304 |
| 2,699,845 | A | * | 1/1955 | Brilliant | 123/195 R |
| 2,764,404 | A | * | 9/1956 | Mercier | 188/129 |
| 2,901,239 | A | * | 8/1959 | Sethna | 177/184 |
| 3,096,066 | A | * | 7/1963 | Granet et al. | 137/493.6 |
| 3,614,125 | A | * | 10/1971 | Sinclair et al. | 180/9.1 |
| 5,901,821 | A | * | 5/1999 | Hanawa | 188/277 |
| 6,296,090 | B1 | * | 10/2001 | Oliver et al. | 188/290 |

* cited by examiner

Primary Examiner—Jack Lavinder
Assistant Examiner—Benjamin A Pezzlo
(74) Attorney, Agent, or Firm—Scott A. McBain

(57) ABSTRACT

A rotary damper for use in an automotive vehicle. The rotary damper includes an outer casing having a main chamber and a pair of piston orifices, the main chamber and the piston orifices being filled with a damping fluid, a pivotable cam located in the main chamber and attached to an arm for transferring the rotary movement of the arm to the cam. The damper also includes a pair of pistons, each located in its own orifice, and connected to opposite sides of the cam. When the arm transfers the rotary movement to the cam, each piston is moved in opposite directions in its respective piston orifice to damp the rotary movement of the arm.

23 Claims, 14 Drawing Sheets

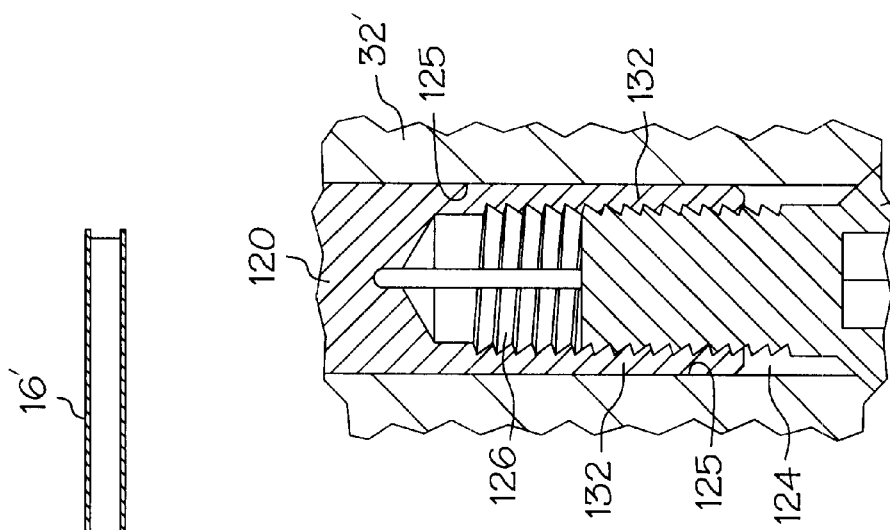
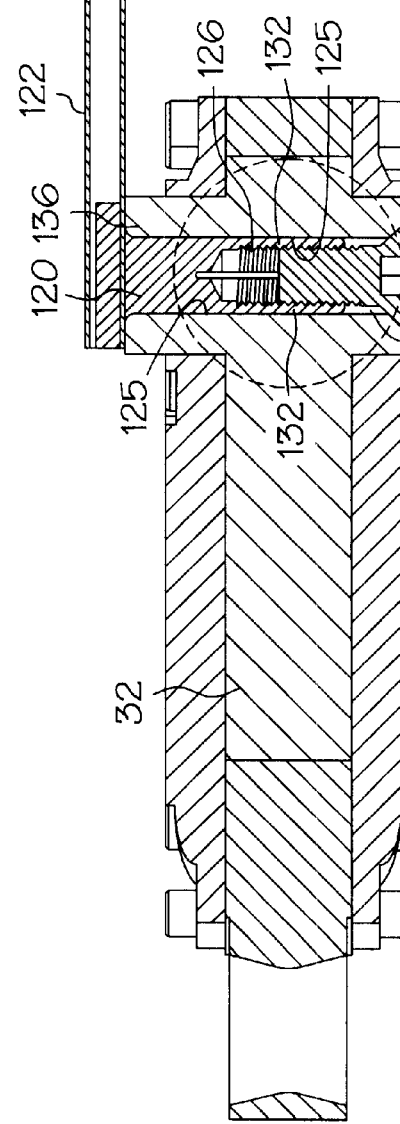
FIG. 11
FIG. 10

ROTARY DAMPER

CROSS REFERENCE TO RELATED APPLICATIONS

This application is a continuation-in-part of U.S. application Ser. No. 09/494,996, filed Jan. 31, 2000 now U.S. Pat. No. 6,296,090.

TECHNICAL FIELD

The present invention relates to vibration damping devices, and more particularly, to rotary dampers for use in automotive vehicle shock absorbing systems.

BACKGROUND OF THE INVENTION

Automobiles and other vehicles utilize shock absorbers to dissipate shock and vibrational forces sustained by the vehicle wheels. The vehicles typically use conventional, linear-style shock absorbers. Such shock absorbers may include a pair of telescoping cylindrical sleeves oriented generally vertically in the vehicle. A piston is attached to one of the sleeves and travels in a fluid-filled cylinder associated with the other sleeve. One of the sleeves is coupled to a wheel support structure of the associated vehicle and the other sleeve is attached to the frame of the vehicle. When shock or vibrational forces displace the associated vehicle wheel relative to the associated vehicle, the force drives the piston along the cylinder, thereby forcing fluid through an orifice in the piston, which resists such motion with a force proportional to the shock force. In conventional shock absorbers, the shock absorber must extend between the vehicle body and wheel support structure, and must be oriented along the direction of travel of the wheel support structure in response to a shock load. Therefore, the conventional linear-style shock absorber is limited in its spatial orientation.

Rotary shock absorbers, or rotary dampers, have been developed to replace linear-style shock absorbers. Rotary shock absorbers have several advantages over conventional linear-style shock absorbers and operate by converting shock forces into rotary motion, and then damping the rotary motion. For example, rotary shock absorbers are not limited in spatial orientation relative to the vehicle body to oppose shock forces, as are linear-type shock absorbers. Rotary dampers may be oriented generally horizontally, and thereby extend underneath the body of the associated vehicle. Furthermore, because the rotary damper is more isolated from the vehicle frame than conventional linear-type shock absorbers, shock and vibrational forces (including noise) are not transmitted from the shock absorber to the vehicle body to the same extent as prior art linear-style shock absorbers.

Rotary dampers typically include a shaft, arm, or cam which transmits shock forces from the wheel to one or more components that are forced through a fluid filled chamber to damp the shock forces. However, existing rotary dampers can be relatively large, lack durability, and be expensive to manufacture. Accordingly, there is a need for a rotary damper that is compact, durable, and inexpensive.

SUMMARY OF THE INVENTION

The present invention is a rotary damper, suitable for use in an automotive vehicle shock absorbing system, which is compact, robust and relatively inexpensive to fabricate. The rotary damper of the present invention includes a rotatable cam coupled to a pair of pistons, each mounted in its own fluid-filled orifice and coupled to opposite sides of the cam such that rotation of the cam causes the pistons to move within their respective piston orifice. The movement of the pistons in the piston orifices in response to movement of the cam forces the fluid through a set of valves, which damps the applied forces.

In a preferred embodiment, the damper includes an outer casing enclosing a main chamber and a pair of piston orifices filled with a damping fluid. A pivotable cam is located in the main chamber and is attached to an arm which typically is connected to a wheel support structure. The damper also includes a pair of pistons, each located in one of the pair of orifices and connected to opposed sides of the cam. The arm is connected to pivot about its connection to the cam. Movement of the arm pivots the cam within the main chamber, which moves each piston in opposite directions in its respective piston orifice. Displacement of the piston forces fluid through orifices in the pistons which damps the rotary movement of the arm.

Other objects and advantages of the present invention will be apparent from the following description, the accompanying drawing and the appended claims.

SUMMARY OF THE DRAWINGS

FIG. 10 is a side elevation in section of the trailing arm and rotary damper of FIG. 9;

FIG. 11 is a detail showing the trailing arm and rotary damper of FIG. 10;

DESCRIPTION OF THE PREFERRED EMBODIMENT

Figure 1:
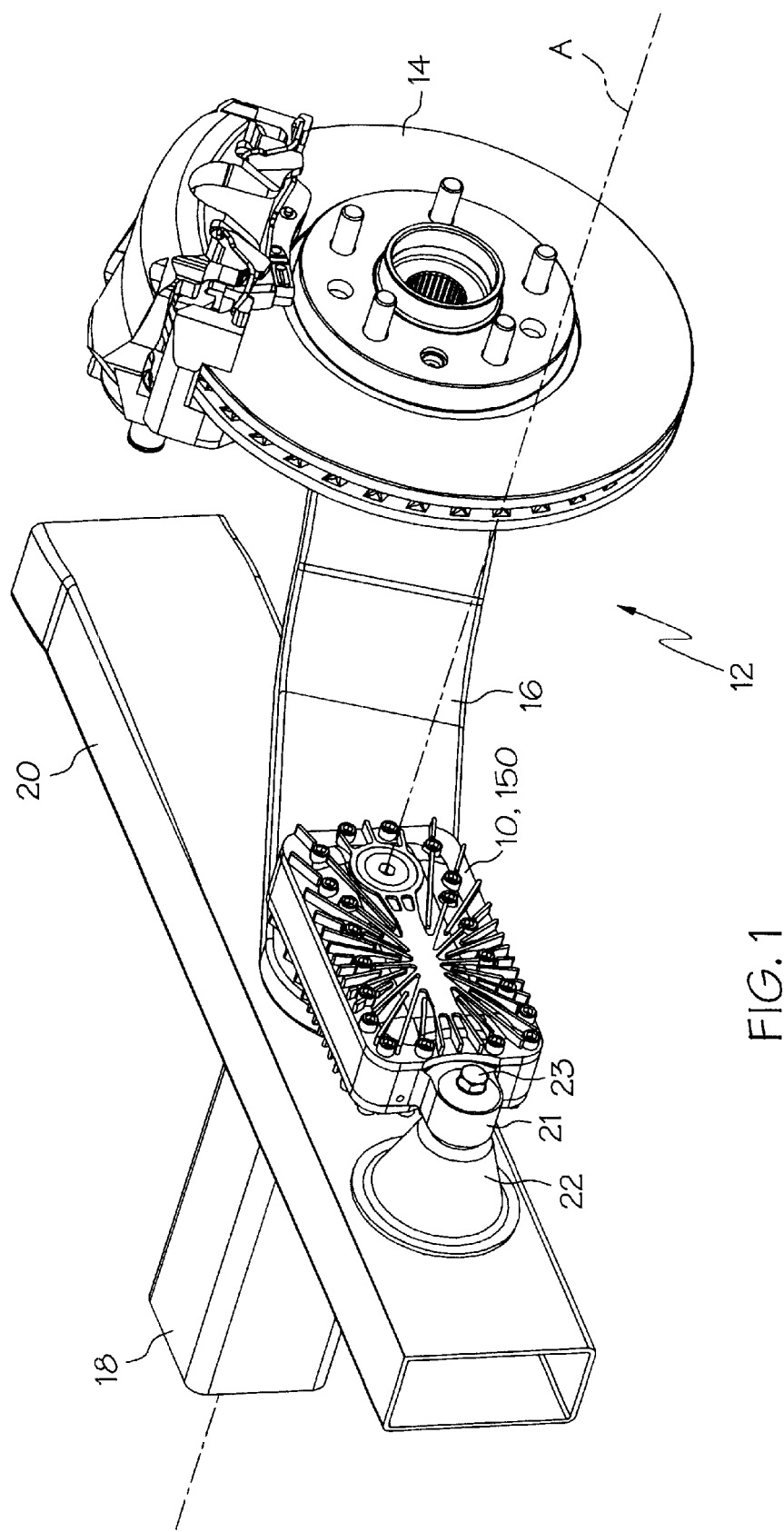
FIG. 1 is a perspective view of a suspension system of a vehicle incorporating one embodiment of the rotary damper of the present invention.

As shown in FIG. 1, the rotary damper 10, 150 of the present invention may be used in a suspension system, generally designated 12, for a vehicle. The suspension system 12 includes a disc and hub assembly 14 upon which a wheel (not shown) may be mounted. A trailing arm 16 extends generally rearwardly from the disc and hub assembly 14, and is coupled to the rotary damper 10 and a torsion spring 18 at the axis A. When shock or vibrational forces are applied to the wheel and the disc and hub assembly 14, the disc and hub assembly 14 is vertically displaced relative to the associated vehicle frame 20. This displacement causes the trailing arm 16 to pivot about the axis A. The torsion spring 18 resists the rotation of the trailing arm 16, and the rotary damper 10 damps the rotation of the trailing arm 16. The rotary damper 10 includes an eye 21 and is mounted to a raised boss 22 on the frame 20 of the vehicle by a bolt 23.

Figure 2:
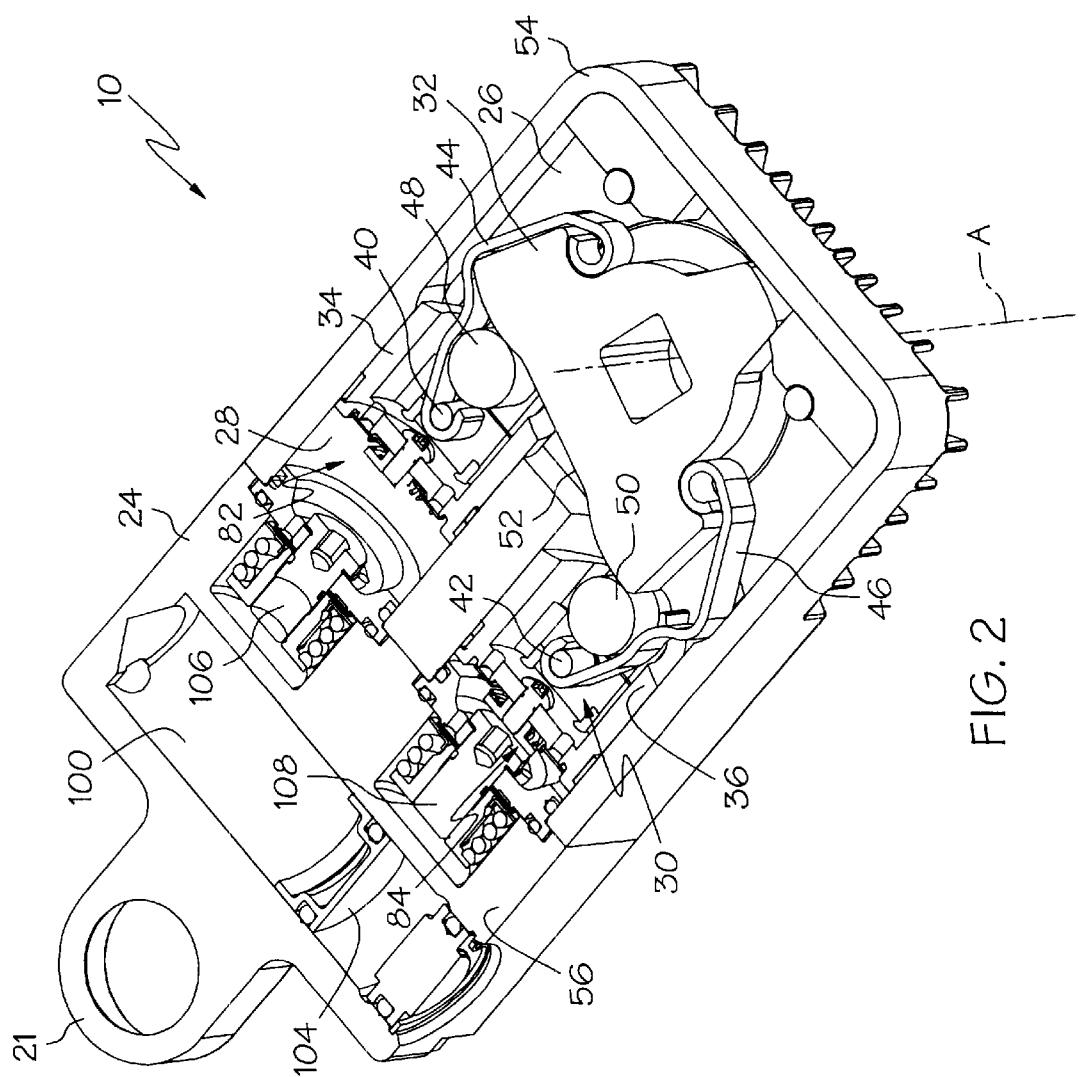
FIG. 2 is a perspective cross section of the damper of FIG. 1.

The rotary damper 10 is shown in greater detail in FIG. 2, and includes an outer casing 24 having a main chamber 26 and a pair of piston orifices 28, 30. The inner volume of the outer casing 24, including the main chamber 26 and the piston orifices 28, 30, is filled with a damping fluid (not shown in FIG. 2). A cam 32 is pivotably mounted in the main chamber 26 such that the cam pivots about the axis A. A pair of pistons 34, 36 are slidably mounted in the piston orifices 28, 30. The piston orifices 28, 30 closely receive, and generally form a seal with, the respective pistons 34, 36.

The pistons 34, 36 each include a pin 40, 42, respectively. Springs 44, 46 are coupled to opposite sides of the cam 32 and to the pins 40, 42 to couple the cam to the pistons 34, 36. Each piston 34, 36 also includes a roller 48, 50 that is pulled into engagement with a lower or cam surface 52 of the cam 32 by the springs 44, 46. The springs 44, 46 are preferably constant length springs, and maintain the alignment between the cam 32 and the pistons 34, 36. The springs 44, 46 also maintain contact between the cam 32 and the rollers 48, 50. The rollers 48, 50 are preferably made of a self-lubricating material.

Figure 3:
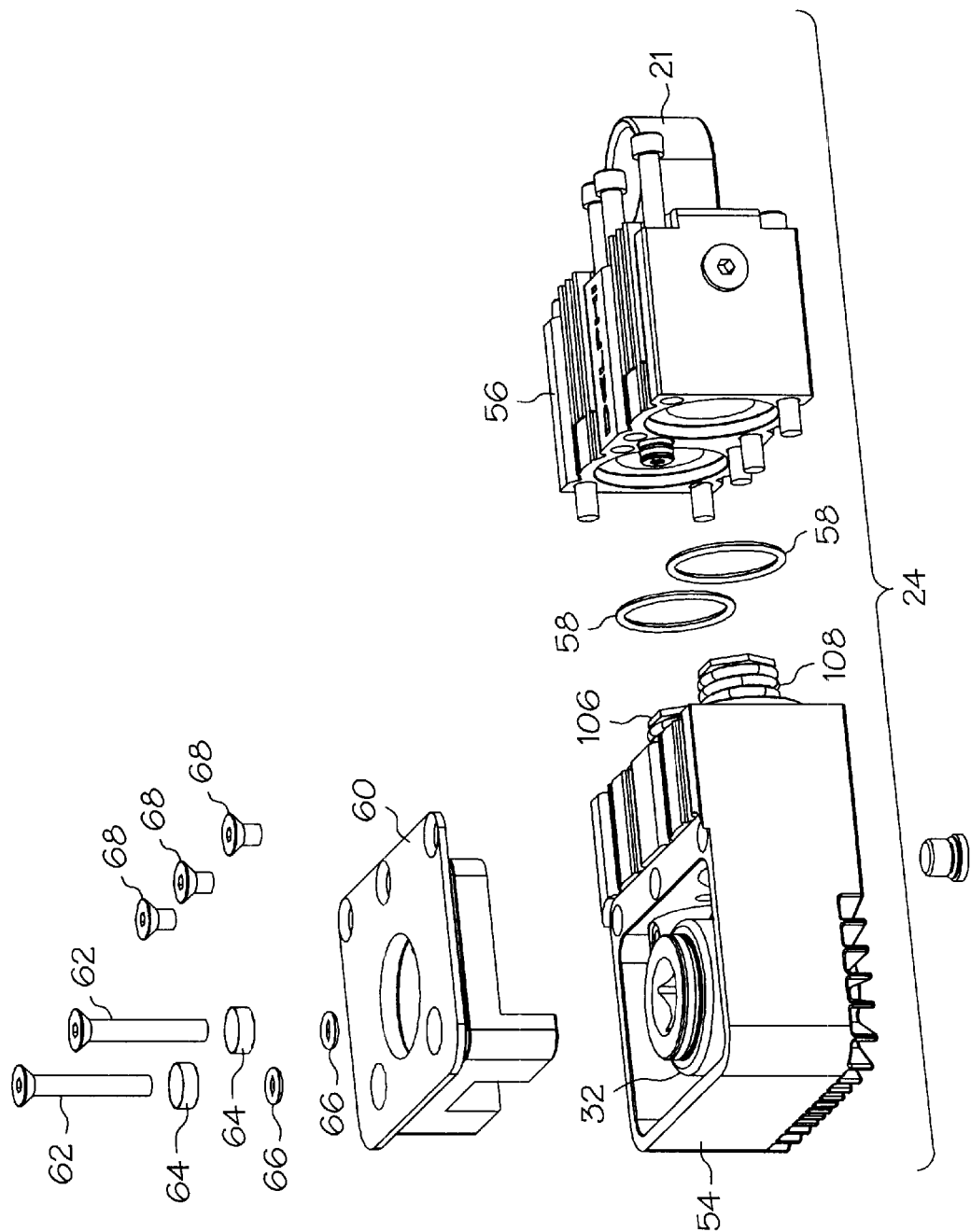
FIG. 3 is a perspective, exploded view of the damper of FIG. 1.

As shown in FIG. 3, the damper housing 24 includes upper housing and lower housing portions 54, 56. A pair of O-rings or seals 58 are located between the upper housing portion 54 and the lower housing portion 56. A cover assembly 60 is mounted over the main chamber 26 and is attached to the upper housing portion 54 by a pair of flat head screws 62 located on top of a pair of seal washers 64 and a pair of O-rings 66. A second set of screws 68 further attach the cover assembly 60 to the upper housing portion 54.

Figure 4:
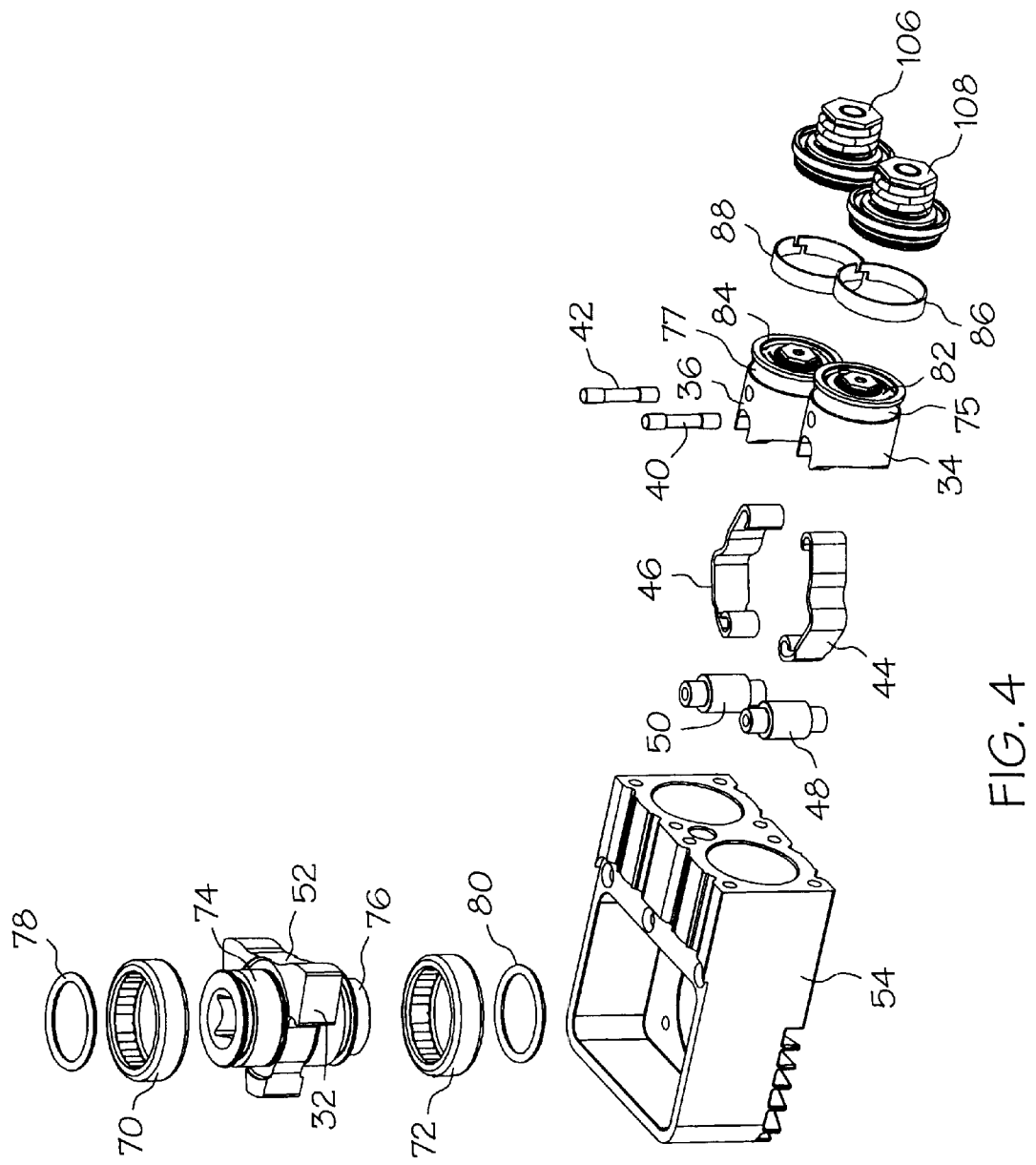
FIG. 4 is a perspective, exploded view of the upper housing portion of the damper of FIG. 1.

As shown in FIG. 4, the upper housing portion 54 receives the cam 32, and roller bearings 70, 72 are mounted on a pair of cylindrical ends 74, 76 of the cam to guide the rotation of the cam 32. A pair of O-rings 78, 80 are also mounted on the cylindrical ends 74, 76 of the cam 32. Each of the pistons 34, 36 has a piston valve 82, 84, respectively, at its bottom, and a pair of bands 86, 88 are seated on annular grooves 75, 77 on the pistons. The bands 86, 88 help to form a seal between the pistons 34, 36 and their piston orifices 28, 30. The bands 86, 88 preferably are made of a self-lubricating material to facilitate the sliding of the pistons.

Figure 5:
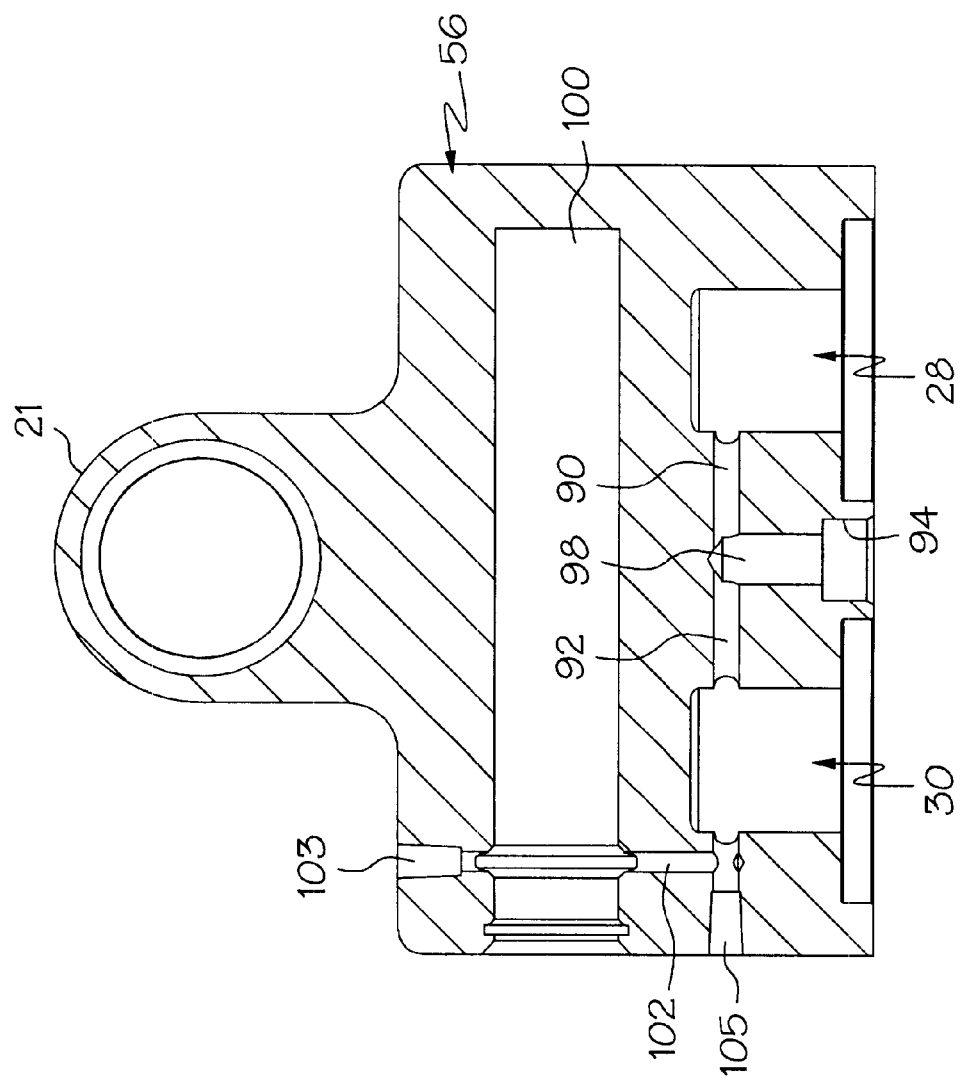
FIG. 5 is a top plan view in section of the lower housing portion of the damper shown in FIG. 3.
Figure 6:
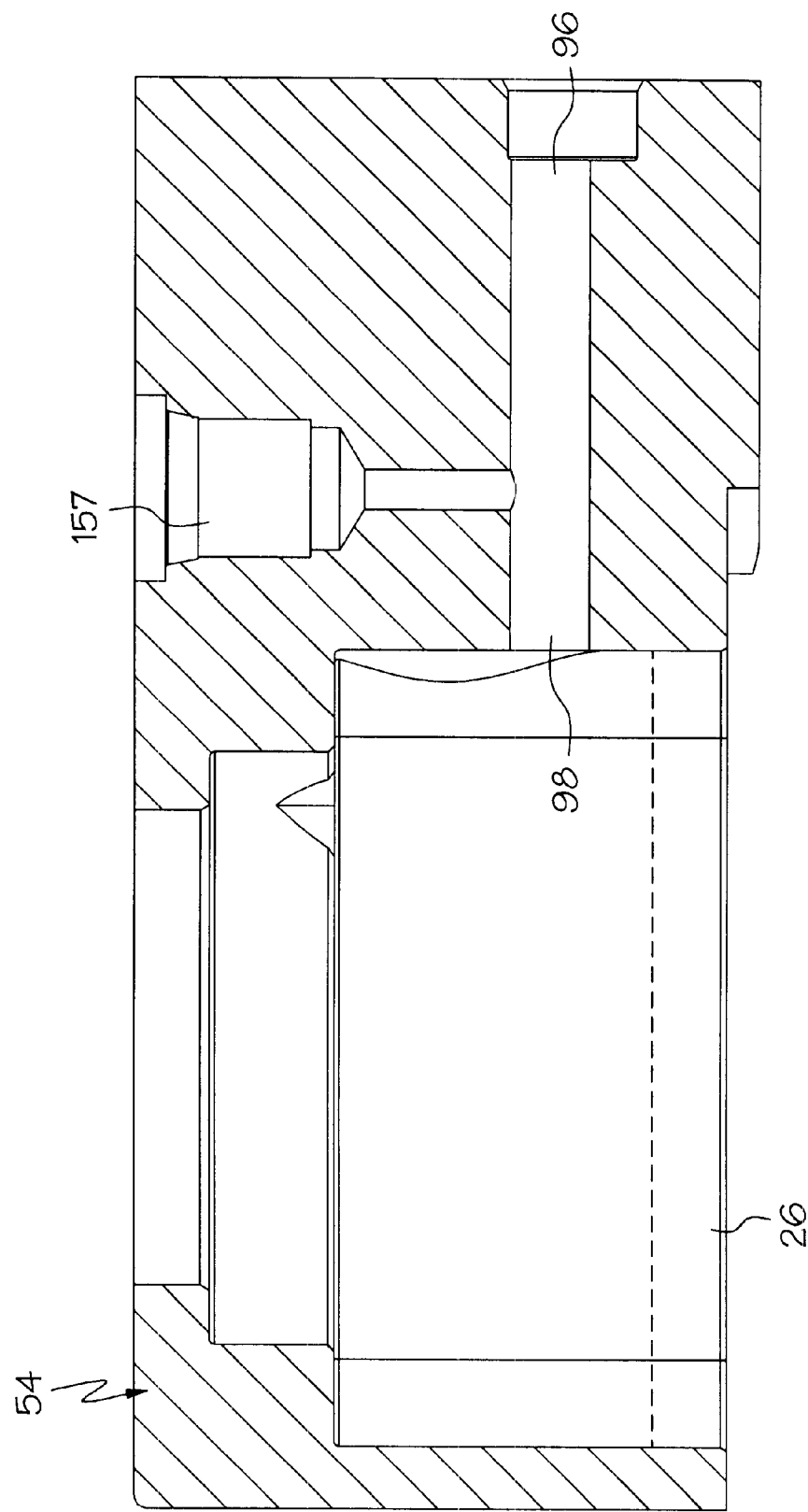
FIG. 6 is a side elevational view in section of the upper housing portion of the damper shown in FIG. 3.

With reference to FIG. 5, the lower housing portion 56 includes a pair of laterally extending orifices 90, 92 that are in fluid communication with the piston orifices 28, 30. The laterally extending orifices 90, 92 connect to a single longitudinal passage 94, which is in fluid communication with a longitudinal passage 96 in the upper housing portion 54 (FIG. 6), and the longitudinal passage 96 in the upper housing portion 54 is in fluid communication with the main chamber 26. In this manner, the laterally extending orifices 90, 92 and longitudinally extending orifices 94, 96 form a return path 98 that couples the piston orifices 28, 30 to the main chamber 26. The upper housing portion 54 may also include an instrument port 157 to receive sensors for measuring the temperature, pressure, viscosity, or other qualities of the damping fluid.

As shown in FIG. 5, the rotary damper 10 includes an accumulator 100 that is in fluid communication with the laterally extending orifice 92 via a connecting orifice 102. The accumulator 100 receives excess fluid that is not located in the main chamber 26, the piston orifices 28, 30 or the return path 98. The accumulator 100 also accommodates thermal expansion of the fluid. A movable gas cup 104 (FIG. 2) is located in the accumulator 100 to maintain the pressure of the fluid in the accumulator 100 and to maintain the fluid-gas separation. The lower housing portion 56 also incudes fill ports 103, 105 through which fluid may be added to the damper 10 (FIG. 5).

Returning to FIG. 2, the pistons 34, 36 include piston valves 82, 84, respectively, that control the flow of fluid from the main chamber 26 to the respective piston orifices 28, 30. The piston valves 82, 84 are biased in the closed position such that the flow of fluid from the main chamber 26 to the respective piston orifices 28, 30 is normally blocked. However, when the pressure in the main chamber 26 exceeds the pressure in the respective piston orifice 28, 30 by a predetermined value, the piston valves 82, 84 open and allow fluid to flow from the main chamber 26 to the respective piston orifices 28, 30. The piston valves 82, 84 generally do not allow fluid to flow through the valves 82, 84 from the piston orifices 28, 30 to the main chamber 26.

Chamber valves 106, 108 are located at the bottom of the piston orifices 28, 30 and control the flow of fluid from the piston orifices 28, 30 to the main chamber 26 via the return path 98. The chamber valves 106, 108 are biased in the closed position such that fluid flow from the piston orifices 28, 30 to the respective laterally extending orifices 90, 92 (and thereby the main chamber 26) is normally blocked. However, when the pressure in the piston orifices 28, 30 exceeds the pressure in the main chamber 26 by a predetermined value, the chamber valves 106, 108 open and allow fluid to flow from the piston orifices 28, 30 to the main chamber 26 (via the return path 98). The chamber valves 106, 108 generally do not allow fluid to flow through the valves from the main chamber 26 to the piston orifices 28, 30.

Figure 7:
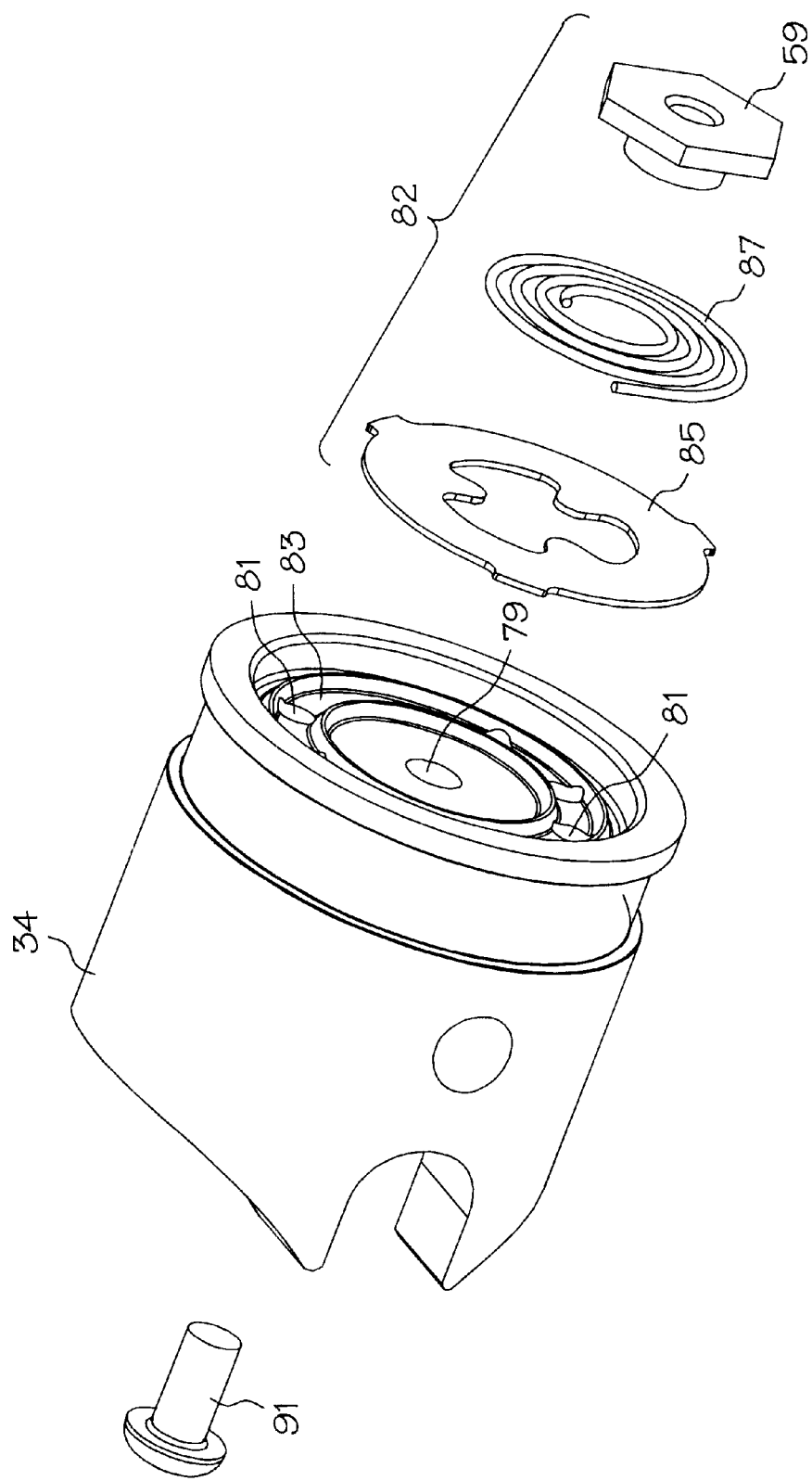
FIG. 7 is a perspective, exploded view of a piston and piston valve of the damper shown in FIG. 2.

The piston valves 82, 84 and chamber valves 106, 108 may take a variety of forms, but in a preferred embodiment they include a disk that is spring biased against a seat. For example, FIG. 7 illustrates a piston 34 and its piston valve 82, the construction and operation of the piston 36 and its piston valve 84 being substantially identical. The piston 34 has a plurality of holes 81 located in its bottom surface, or valve seat 83. A disk 85 is biased against the valve seat 83 to block flow through the holes 81. The disk 85 is biased against the valve seat 83 by a spring 87. A screw 91 is passed through a hole 79 in the bottom of the piston 34, and is threaded into a valve nut 59 to hold the valve assembly 82 together. When the pressure upstream of the disk 85 (i.e. pressure in the main chamber 26) reaches a sufficient level relative the pressure downstream of the disk 85 (i.e. pressure in the piston orifice 28), the disk 85 is moved away from the seat 83, compressing the spring 87. This allows fluid to flow through the holes 81 and into the piston orifice 28. When the pressure differential drops to a sufficient level, the disk 85 is pressed against the seat 83 by the spring 87, thereby closing the valve 82.

Figure 8:
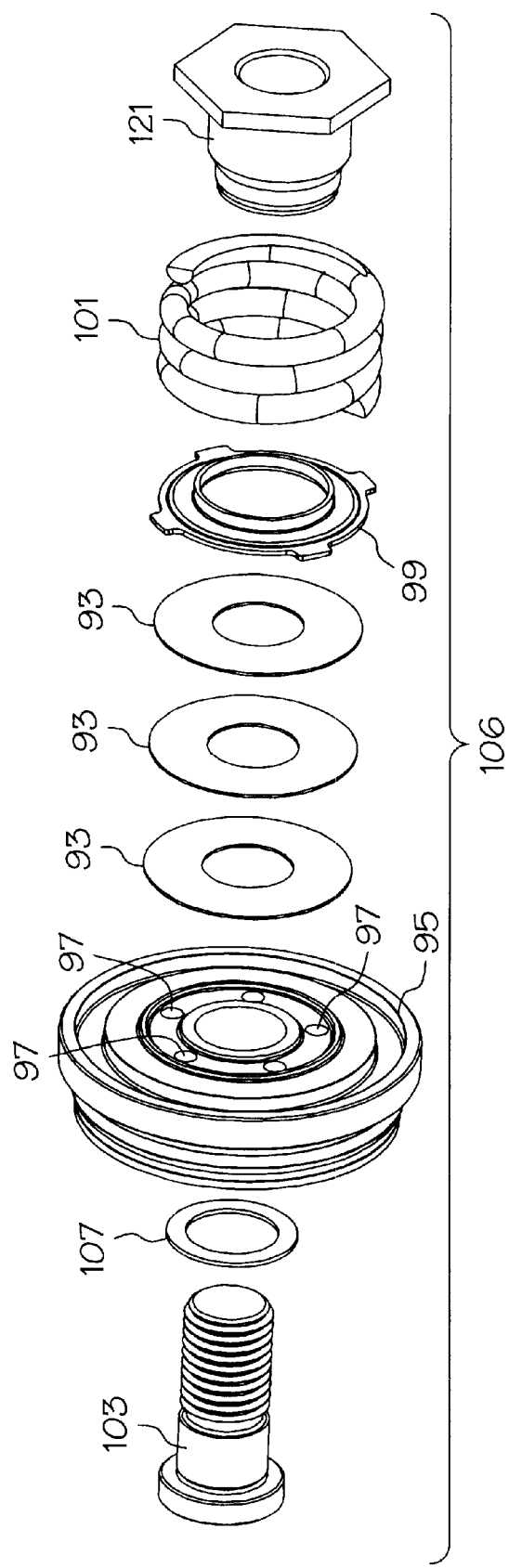
FIG. 8 is a perspective, exploded view of a chamber valve of the damper shown in FIG. 2.

The operation and construction of the chamber valves 106, 108 is similar to that of the piston valves 82, 84. The chamber valve 106 is shown in FIG. 8, the operation and construction of the chamber valve 108 being substantially identical. The chamber valve 106 includes a valve base 95 having a plurality of holes 97. A number of valve disks 93 are biased against the valve base 95 to selectively block flow through the holes 97. The valve disks 93 are located adjacent to a spring seat 99, which receives a rebound or coil spring 101. The valve assembly 106 is held together by a valve bolt 103 that is threaded into a shoulder nut 121. A gasket 107 is located between the valve bolt 103 and the valve base 95.

In operation, when pressure in the piston orifice 28 exceeds the pressure in the master chamber 26 by a sufficient level, the disks 93 and spring seat 99 are moved away from the valve base 95 such that fluid can flow through the holes 97. When sufficient pressure in the piston orifice 18 is released, the disks 93 are pressed against the valve base 95 by the spring 101 to close the valve 106. The number and thickness of the valve disks 93, as well as the spring constant in the rebound spring 101, may be changed to vary the damping characteristics of the damper 10 as desired. Three valve disks 93 are shown, although the number of valve disks may be varied as desired to change the characteristics of the valve 106.

When shock or vibrational forces are applied to the trailing arm 16 (FIG. 1), the trailing arm rotates about central axis A. Because the trailing arm 16 is coupled to the cam 32 and torsion spring 18, the cam 32 and torsion spring 18 are rotated about axis A. When the cam 32 rotates about axis A (FIG. 2), the rotation of the cam causes the pistons 34, 36 to move in opposite directions in the piston orifices 28, 30. For example, referring to FIG. 2, when the cam 32 is rotated counterclockwise, the cam surface 52 bears against the roller 48 of the piston 34, and thereby urges the piston 34 up and to the left of its position shown in FIG. 2. This increases the pressure of the fluid in the piston orifice 28. When the pressure differential between the piston orifice 28 and the main chamber 26 reaches the cracking pressure for the chamber valve 106, the chamber valve 106 opens. When the chamber valve 106 opens it allows fluid to flow into the laterally extending orifice 90 of the return path 98, and the fluid then flows through the return path 98 and into the main chamber 26.

Simultaneously, the spring 46 on the opposite side of the cam 32 pulls the piston 36 down and to the right of its position as shown in FIG. 2, which decreases the pressure of the fluid in the piston orifice 30 relative to the main chamber 26. When the pressure in the piston orifice 30 is reduced sufficiently compared to the pressure in the main chamber 26, the piston valve 84 opens and allows fluid to flow from the main chamber into the piston orifice 30. The flow of fluid through the restricted orifices of the piston valve 84, chamber valve 106, and return path 98, as well as the pressurization of the fluid, damps the rotational motion of the cam 32, and thereby damps the motion of the trailing arm 16.

Similarly, when the trailing arm 16 is urged in the opposite direction (i.e. clockwise in FIG. 1), the cam 32 of FIG. 2 is moved in the clockwise direction in FIG. 2. This increases the pressure in the piston orifice 30 and causes the chamber valve 108 to open, and reduces the pressure in the piston orifice 28 and causes the piston valve 82 to open. The flow of fluid through the restricted orifices of the piston valve 82, chamber valve 108, and return path 98, as well as the pressurization of the fluid, damps the rotational movement of the cam 32 and trailing arm 16.

The cam surface 52 is preferably shaped as an involute curve so that the rate of rotation of the cam 32 is proportionally translated into linear movement of the pistons 34, 36. In this embodiment, the damper 10 provides generally uniform damping for a given angular displacement of the trailing arm 16, regardless of the position of the trailing arm 16. However, the shape of the cam surface 52 may be varied to provide differing damping characteristics depending upon the location of the trailing arm 16 and the disk and hub assembly 14. For example, in order to help control the movement of the vehicle wheel when the wheel is located near the limits of its (vertical) travel, the cam surface 52 may be shaped to increase the damping forces when the wheel is located at these extreme positions. In this case, when the trailing arm 16 (and therefore the wheel and hub assembly 14) is outside of normal operating conditions, any additional angular displacement of the trailing arm that causes the trailing arm 16 to move further outside of normal operating conditions may cause increased displacement of the pistons 34, 36 (and therefore additional damping) as compared to the damping that the trailing arm would experience for the same angular displacement if the trailing arm were within normal operating conditions. In this manner the cam surface 52 may be shaped to provide softer damping when the trailing arm 16 (and therefore the disk and hub assembly 14) is in normal operating conditions, and firmer damping when the trailing arm 16 is located outside of normal operating conditions.

The damping forces applied by the damper 10 may also be varied as a function of the displacement of the wheels caused by a load carried by the vehicle. Finally, the cam surface 52 may provide different damping forces when the disk and hub assembly 14 is rising (jounce) as opposed to downward movement of the disk and hub assembly 14 (rebound). Of course, the shape of the cam surface 52 may be varied in a number of other manners beyond those discussed herein to vary the performance of the damper 10.

Figure 9:
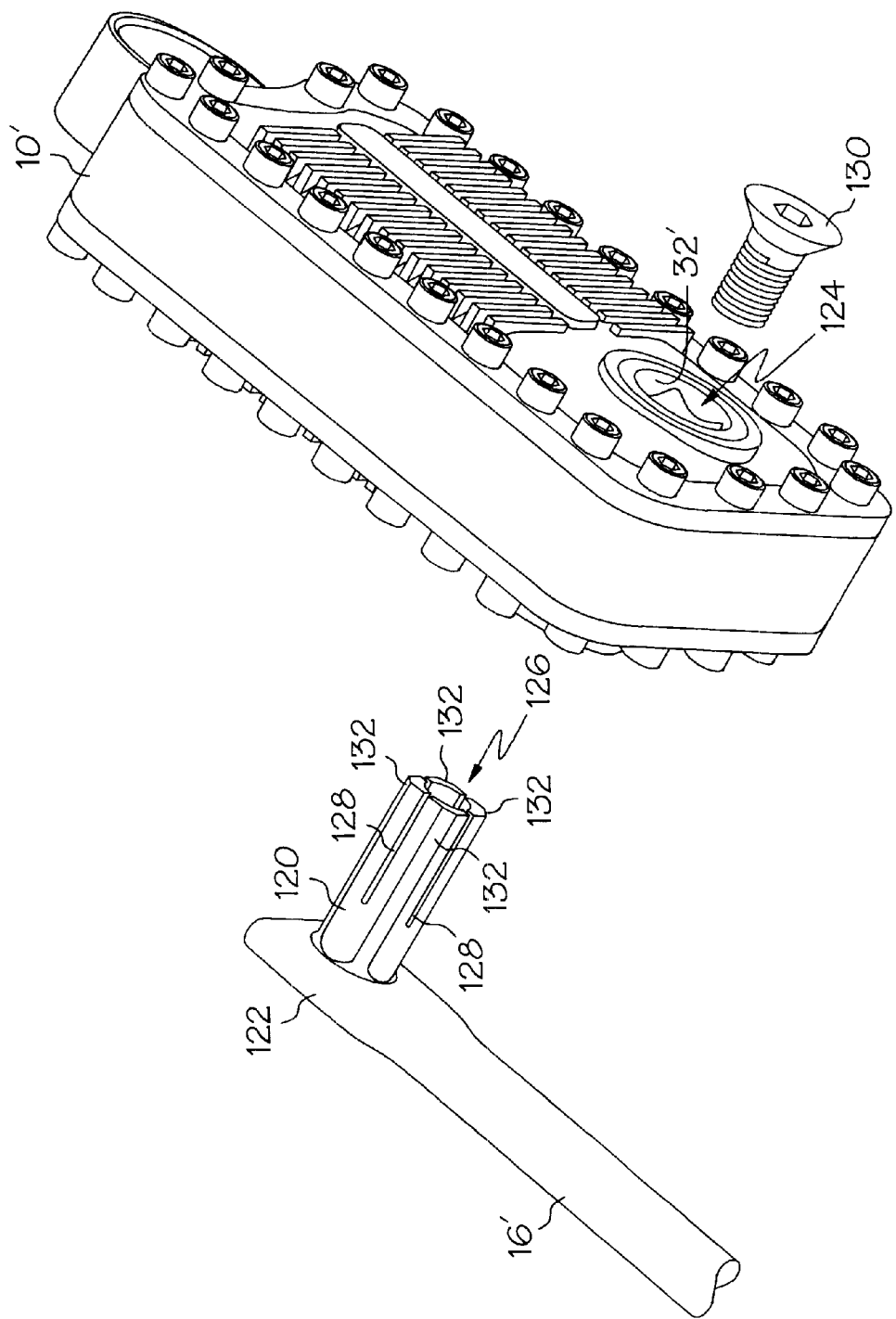
FIG. 9 is a perspective view showing an assembly for coupling a trailing arm to the rotary damper of FIG. 2.
Figure 12:
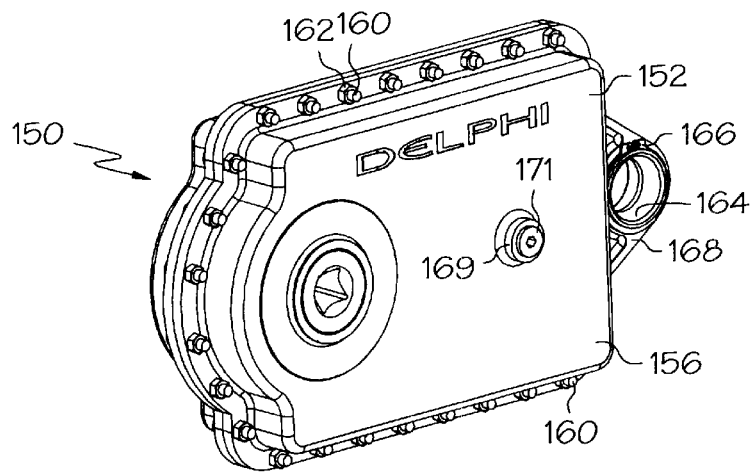
FIG. 12 is a perspective view of an alternate embodiment of the rotary damper of the present invention.

A preferred structure for attaching a trailing arm to a rotary damper is shown in FIGS. 9–11. The trailing arm 16' and rotary damper 10' shown in FIGS. 9–11 differ slightly from the trailing arm 16 and rotary damper 10 discussed above, but the structure for coupling the trailing arm 16' to the rotary damper 10' shown in FIGS. 9–11 and described below may be used in nearly any rotary damper, including the rotary damper 10 discussed above or rotary damper 150 described below. As shown in FIG. 9, the trailing arm 16' includes a shoulder pin 120 extending from an upper end 122 of the trailing arm 16'. The shoulder pin 120 is preferably eccentric or non-circular in cross section, and in the illustrated embodiment the shoulder pin is square in cross section. The cam 32' of the rotary damper 10' includes a through hole 124 that is shaped to closely receive the shoulder pin 120, which means that, in this embodiment, the through hole 124 is also square. The shoulder pin 120 includes a threaded hole 126, and the pin 120 includes a set of longitudinal slots 128 that extend through the pin 120 to the threaded hole 126. The slots 128 define a set of four arms 132 that are located adjacent the end of the shoulder pin 120 that is received in the hole 124 of the cam 32'.

In order to couple the trailing arm 16' to the cam 32', the shoulder pin 120 is inserted into the hole 124 of the cam 32'. The eccentric shape of the shoulder pin 120 and hole 124 ensures that any rotary movement of the trailing arm 16' is transferred to the cam 32'. Next, a screw 130 is threaded into the threaded hole 126. As the screw 130 is received in the hole 126, the arms 132 are urged radially outwardly and into contact with the walls 125 of the hole 124 of the cam 32' (FIGS. 10–11). When the screw 130 is tightened down, the frictional forces between the arms 132 and the walls 125 of the hole 124 couple the shoulder pin 120, and thereby the trailing arm 16', to the cam 32'. The angles of the threads of the hole 126 may be formed such that the arms 132 are urged radially outwardly with greater force as the screw 130 is driven deeper into the hole 126.

The screw 130 is preferably a flathead screw, and the hole 124 in the cam 32' includes countersinks 136 to enable the screw 130 to be located flush with or recessed below the outer face of the cam 32'. Furthermore, the shoulder pin 120 and cam 32' are shaped such that the trailing arm 16' can be attached to either side of the rotary damper 10' using this attachment assembly. Compared to the prior art assemblies for attaching a trailing arm to a cam, this assembly has a reduced part count, reduces the need for precise manufacturing methods, and is relatively compact. Furthermore, after the trailing arm 16' is coupled to the damper 10', all of the parts of the attachment assembly are visible, which enables inspectors to ensure the trailing arm 16' is properly attached to the damper 10'.

Figure 13:
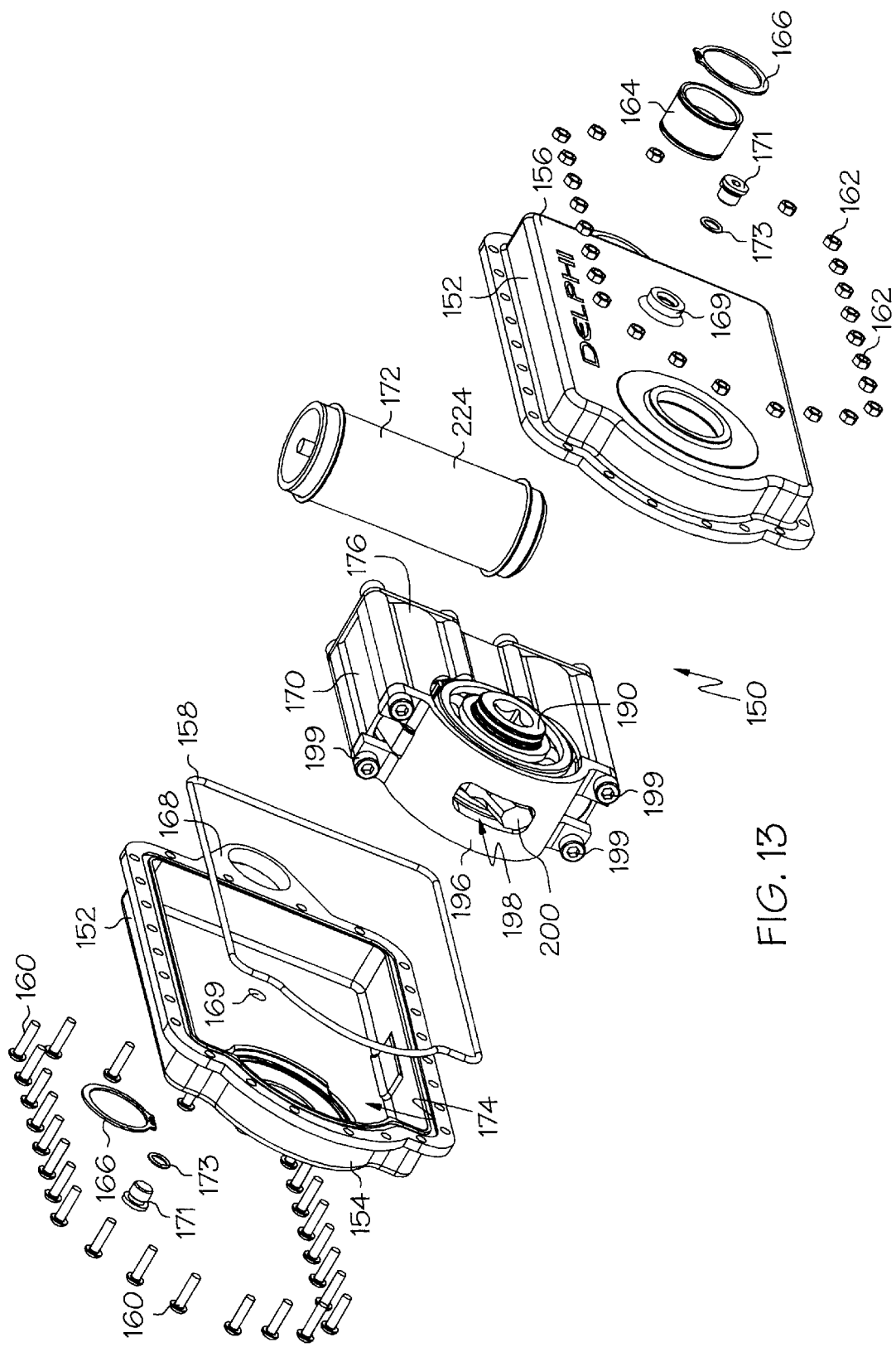
FIG. 13 is a perspective, exploded perspective view of the rotary damper of FIG. 12.

FIGS. 12–16 illustrate an alternate embodiment of the present invention. In this embodiment, as shown in FIG. 13, the damper 150 includes an outer casing 152 including a pair of mating shell-like portions 154, 156 defining an inner cavity 174 therebetween. A seal 158 is interposed between the portions 154, 156 of the outer casing 152, and the portions 154, 156 are coupled together by a set of screws 160 spaced around the outer perimeter of the outer casing 152, each screw 160 being received in a corresponding nut 162.

Each portion 154, 156 of the casing 152 also includes an instrument or fill port 169. Each fill port 169 has an associated plug 171 for stopping the port 169, and each plug 171 includes an O-ring 173 located thereon for sealing the port 169. The damper 150 includes a cylinder 164 and a pair of retaining rings 166 that are received in the eye 168 of the casing 152.

The casing 152 receives a piston block assembly 170 and an accumulator 172 in the inner cavity 174 of the casing 152. The inner cavity 174 is filled with fluid (not shown) such that the piston block 170, accumulator 172 and other components inside the casing 152 are immersed in fluid.

Figure 14:
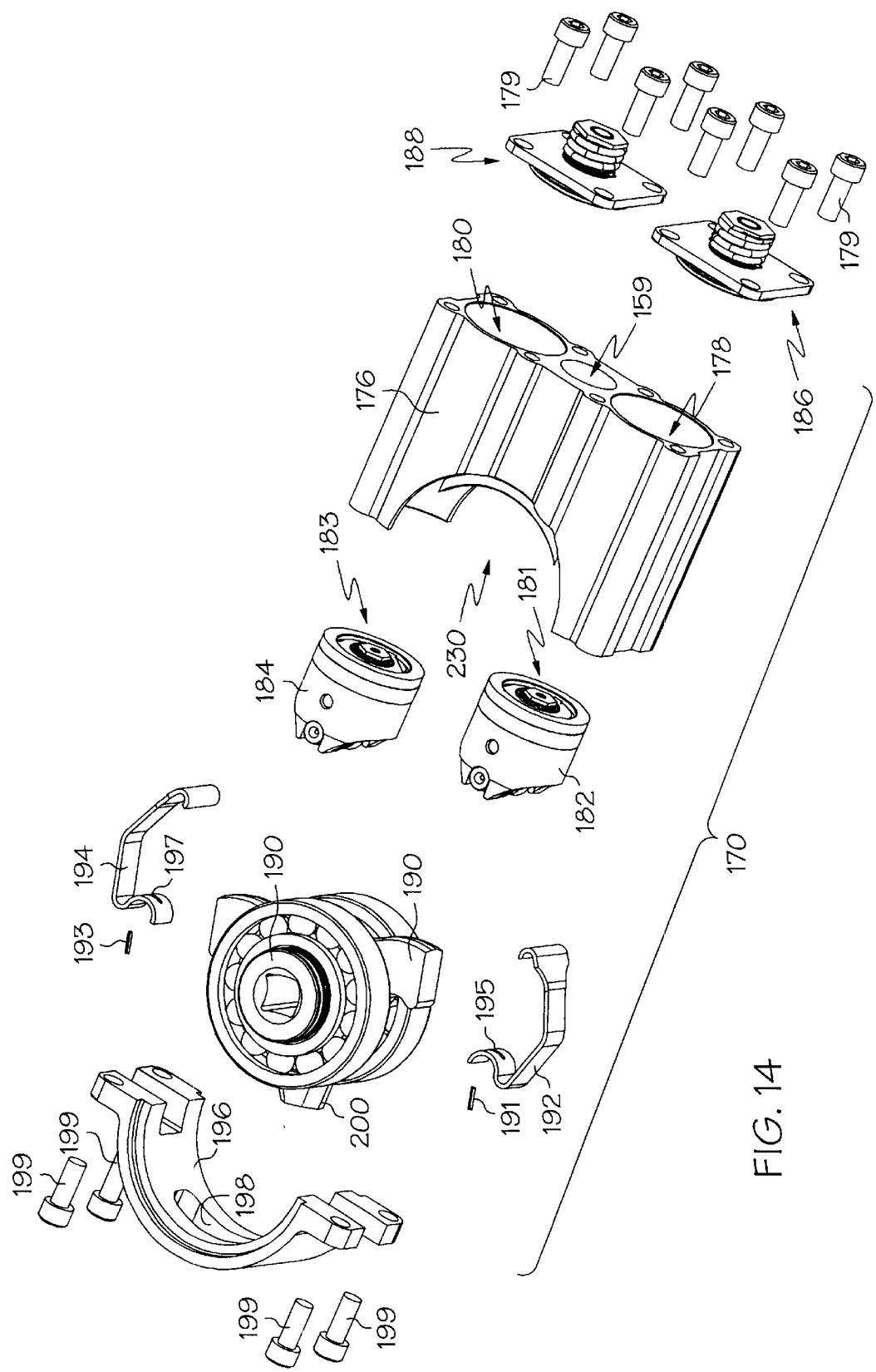
FIG. 14 is a perspective, exploded view of the piston block assembly of the rotary damper of FIG. 13.

As shown in FIG. 14, the piston block assembly 170 includes a machined block 176 including a central orifice 159 and a pair of piston orifices 178, 180 formed therein. The machined block 176 preferably has a generally uniform cross section. A pair of pistons 182, 184, similar to the pistons 34, 36 described above are received in the piston orifices 178, 180. Each piston 182, 184 has a piston valve 181, 183 similar to the piston valves 82, 84 described above. The damper 150 further includes a pair of chamber valves 186, 188 similar to the chamber valves 106, 108 described above. The chamber valves 186, 188 are mounted to the machined block 176 by a set of screws 179 to control the flow of fluid exiting through the piston orifices 178, 180.

The damper 150 includes a cam 190 and a pair of springs or spring-arms 192, 194 similar to the cam 32 and springs 44, 46 described above. The damper 150 further includes a pair of guide pins 191, 193. Each guide pin 191, 193 is received through a slot 195, 197 in one of the springs 192, 194 and received in the cam 190 to couple each spring 192, 194 to the cam 190 (see FIG. 15) and to prevent the springs 192, 194 from sliding off of the cam 190. Furthermore, the slots 195, 197 enable each spring 192, 194 to slide relative to the cam 190 along the direction of the slots 195, 197 during rotation of the cam 190.

The piston block assembly 170 includes a cam cover 196 mounted to the machined block 176 by a set of screws 199 to capture the cam 190 between the cam cover 196 and machined block 176. The cam cover 196 includes a slot 198 to receive a protrusion 200 of the cam 190 to limit the rotational motion of the cam 190.

In operation, the damper 150 is similar to the damper 10 described above. The cam 190 (FIG. 15) is coupled to a trailing arm 16, and when the cam 190 is rotated by the trailing arm 16, the cam 190 causes the pistons 182, 184 to move in their associated piston orifice 178, 180. As the pistons 182, 184 are moved, the operation of the chamber valves 186, 188 and the piston valves 181, 183 damp the rotation of the cam 190 and trailing arm 16 as described above.

The valves 181, 183, 186, 188 may experience relatively high pressures during damping operations. However, if any of the valves 181, 183, 186, 188 were to leak for some reason, the resultant "leak" would be contained within the inner cavity 174 of the outer casing 152 because the outer casing 152 is itself sealed. Thus, a "leak" or lack of sealing by any of the valves 181, 183, 186, 188 does not result in a loss of fluid outside the outer casing 152. Therefore, because the chamber valves 186, 188 and piston valves 181, 183 are located generally inside the machined block 176, the damper 150 does not have high pressure valves that may leak to the outside of the damper 150.

As noted earlier, the inner cavity 174 of the outer casing 152 is filled with fluid during the use of the damper 150. The inner cavity 174 includes an upper portion 204 located adjacent the cam 190 (i.e. on the "cam-side" of the piston orifices 178, 180), and a lower portion 206 located adjacent to the chamber valves 186, 188. The damper 150 further includes an outer return path 208 (indicated by a series of arrows in FIG. 15) that couples the lower portion 206 and upper portion 204 of the inner cavity 174. The outer return path 208 is located between the machined block 176 and the shell-like portions 154, 156 of the outer casing 152.

Thus, the shape and location of the machined block 176 within the outer casing 152 naturally forms the return path 208. This feature eliminates the need to machine a return path within the damper 150, and instead the outer return path 208 is located between two pre-formed components (i.e., the machined block 176 and outer casing 152). Furthermore, because the entire inner cavity 174 is filled with fluid, the components of the damper 150 are immersed in fluid, which aids in heat dissipation in various components of the damper 150. For example, fluid may travel from the lower portion 206 to the upper portion 204 via an inner return path 209, which can help to lubricate and cool the cam 190. However, the primary path of fluid flowing from the lower portion 206 to the upper portion 205 is preferably the outer flow path 208.

Figure 16:
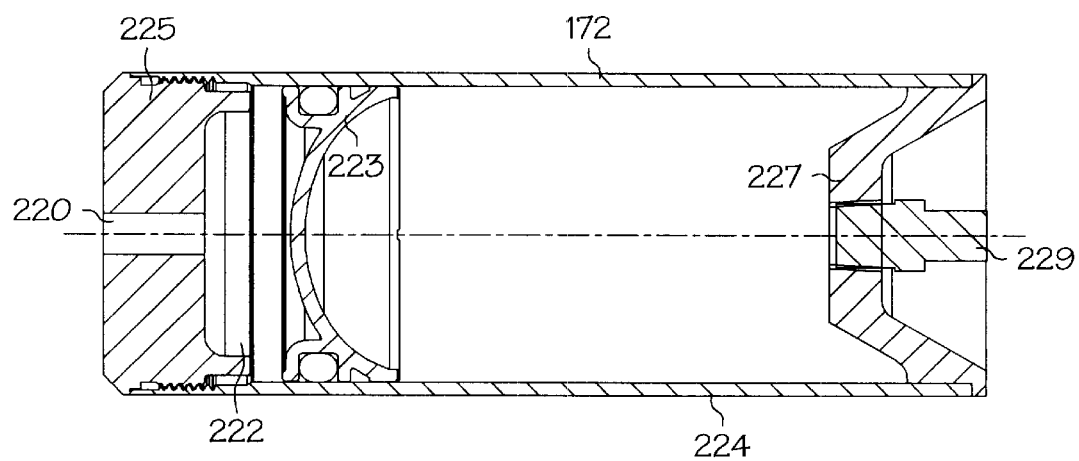
FIG. 16 is a side elevation in section of the accumulator of the rotary damper of FIG. 13.
Figure 15:
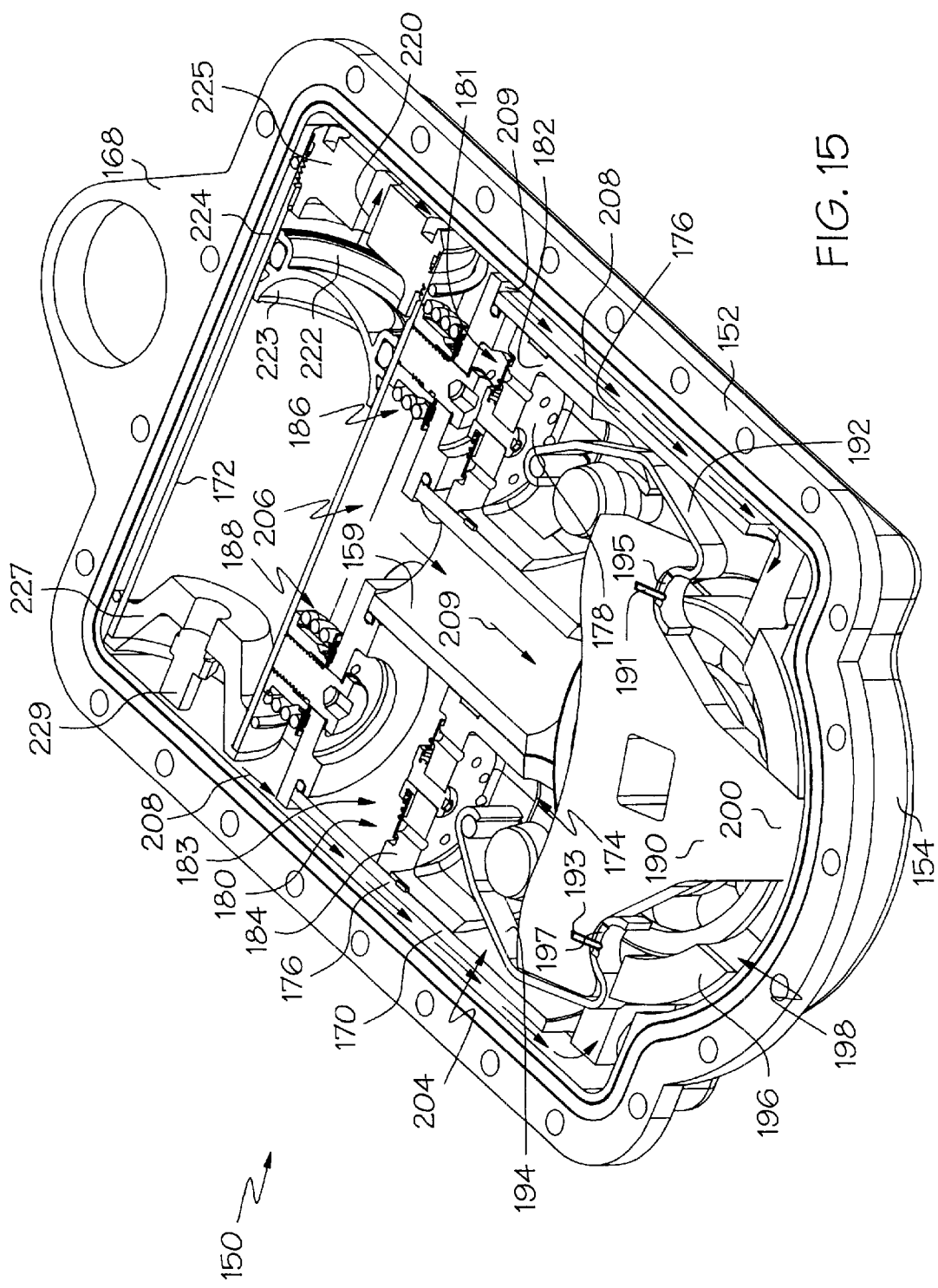
FIG. 15 is a perspective cross section of the rotary damper of FIG. 12.

The accumulator 172 is in fluid communication with the lower portion 206 of the inner cavity 174 via an accumulator path 220 (the direction of the arrows of the return path 220 in FIG. 15 may be reversed depending upon the pressure of the fluid). The accumulator path 220 couples the inner cavity 222 of the accumulator to the inner cavity 174 which enables the accumulator 172 to accommodate thermal expansion and contraction of the fluid and maintain fluid/gas separation. As shown in FIGS. 13 and 16, the accumulator 172 includes an accumulator outer wall 224 such that the accumulator 172 may be a separate component that can be mounted inside the outer casing 152. The accumulator 172 may include a movable gas cap 223, a top cap 225 threaded into the outer wall 224, a lower cap 227, and a seal plug 229 received in the lower cap 227.

As noted earlier, the machined block 176 may have a generally uniform cross section, which enables the machined block 176 to be formed by extrusion methods, and provides for easy manufacturing of the piston orifices 178, 180 and central orifice 159. For example, the machined block 176 may be formed by extruding a piece of metal, such as aluminum, to form a machined block that is generally rectangular in top view. A semi-circular shaped piece of material may be cut, machined or milled away to create the open end 230 (FIG. 14) of the machined block 176 to receive the cam 190. The central orifice 159 helps to reduce the weight of the machined block 176, as well as the material required to manufacture the machined block. The central orifice 159 also helps to reduce thermal stresses that may be set up in the machined block.

Because the accumulator 172 may be a separate stand-alone component (i.e. is not formed within the damper 150), both the accumulator 172 and the machined block 176 or piston block assembly 170 may be formed as separate components (for example at separate plants or at separate locations in a plant). After all of the components for the damper 150 (including the accumulator 172 and piston block 170) are formed, the damper 150 may be assembled using relatively simple assembly techniques.

Having described the invention in detail and by reference to preferred embodiments thereof, it will be apparent that modifications and variations are possible without departing from the scope of the invention.

What is claimed is:

1. A damper for damping rotary movement comprising:
   an outer casing having a main chamber;
   a piston block received in said main chamber, said piston block having a pair of piston orifices in fluid communication with said main chamber, said main chamber and said piston orifices being fillable with a damping fluid, said piston block being a separate structure that is removable from said outer casing;
   a cam pivotally mounted in said main chamber, said cam being attachable to an arm for imparting said rotary movement to said cam; and
   a pair of pistons, each of said pistons being located in one of said piston orifices, said pistons being coupled to opposed sides of said cam such that when said arm transfers said rotary movement to said cam, each piston is moved in opposite directions in its respective piston orifice to damp said rotary movement of said arm.

2. The damper of claim 1 wherein said piston block has a generally uniform cross section such that said piston block can be made using extrusion techniques.

3. The damper of claim 1 wherein said cam is mounted to said piston block.

4. The damper of claim 3 further comprising a cam cover mounted to said piston block, said cam cover capturing said cam between said cam cover and said piston block.

5. The damper of claim 4 wherein said cam includes a protrusion and said cam cover includes a slot receiving said protrusion therethrough to limit the rotational movement of said cam.

6. The damper of claim 1 further comprising a pair of chamber valves mounted to said piston block and positioned at said piston orifices for selectively controlling the flow of fluid through said piston orifices.

7. The damper of claim 6 wherein said main chamber includes an upper portion located on a first side of said piston orifices and a lower portion located on a second side of said piston orifices, and a return path coupling said upper and lower portions.

8. The damper of claim 7 wherein said return path is located between said piston block and said outer casing.

9. The damper of claim 7 wherein said return path is located in an orifice extending through said piston block.

10. The damper of claim 7 wherein said chamber valves block the flow of fluid from said lower portion of said main chamber to said piston orifices and selectively control the flow of fluid from said piston orifices to said lower portion of said main chamber.

11. The damper of claim 7 wherein each of said pistons includes a piston valve selectively controlling the flow of fluid from said upper portion of main chamber to a respective one of said piston orifices and blocks flow of fluid from a respective one of said piston orifices to said upper portion of said main chamber.

12. The damper of claim 7 further comprising an accumulator for maintaining the desired pressure in said fluid, wherein said accumulator includes an accumulator outer wall such that said accumulator is removable from said outer casing.

13. The damper of claim 12 wherein said accumulator is in fluid communication with said return path.

14. The damper of claim 12 wherein said accumulator includes a slidable gas cup to maintain pressure of said fluid.

15. The damper of claim 1 wherein said pistons move generally linearly in said piston orifices.

16. The damper of claim 1 further comprising a pair of springs coupled to said cam and to said pair of pistons, said springs coupling said cam to said pair of pistons for movement in a first direction.

17. The damper of claim 16 further comprising a pair of alignment pins, each alignment pin being mounted to said cam and received in a slot in each of said springs to couple each spring to said cam.

18. The damper of claim 16 wherein said cam includes a cam surface that engages and moves said pistons in a second direction.

19. The damper of claim 16 wherein said cam surface is an involute curve.

20. The damper of claim 1 wherein said cam is coupled to a torsion spring which opposes the rotary movement of said arm.

21. A damper for damping rotary movement comprising:
   an outer casing having piston block received therein, said piston block having a pair of piston orifices fillable with a damping fluid, said piston block being sized and located in said outer casing to define a return path located between said piston block and said outer casing, said piston block being a separate structure that is removable from said outer casing;
   a cam pivotally mounted in said outer casing, said cam being attachable to an arm for transferring said rotary movement to said cam; and
   a pair of pistons connected to said cam, each piston being located in one of said pair of piston orifices, wherein pivoting movement of said cam relative to said casing moves said pistons in opposite directions in their respective one of said piston orifices to damp said pivoting movement of said cam.

22. The damper of claim 21 wherein said outer casing includes a main chamber, said main chamber including an upper portion located on a first side of said piston orifices and a lower portion located on a second side of said piston orifices, and wherein said return path connects said upper and lower portions.

23. A damper for damping rotary movement comprising:
   an outer casing having a main chamber;

a piston block received in said main chamber, said piston block having a pair of piston orfices in fluid communication with said chamber, said main chamber and said piston orfices being fillable with a damping fluid;

a cam pivotally mounted in said main chamber and mounted to said piston block, said cam being attached to an arm for imparting said rotary movement to said cam; and a pair of pistons, each of said pistons being located in one of said piston orfices, said pistons being coupled to opposed sides of said cam such that when said arm transfers said rotary movement to said cam, each piston is moved in opposite directions in its respective piston orifice to damp said rotary movement of said arm.

* * * * *